(No Model.)
G. G. GREENOUGH.
LOADING APPARATUS FOR CARTRIDGE SHELLS.
No. 376,148. Patented Jan. 10, 1888.
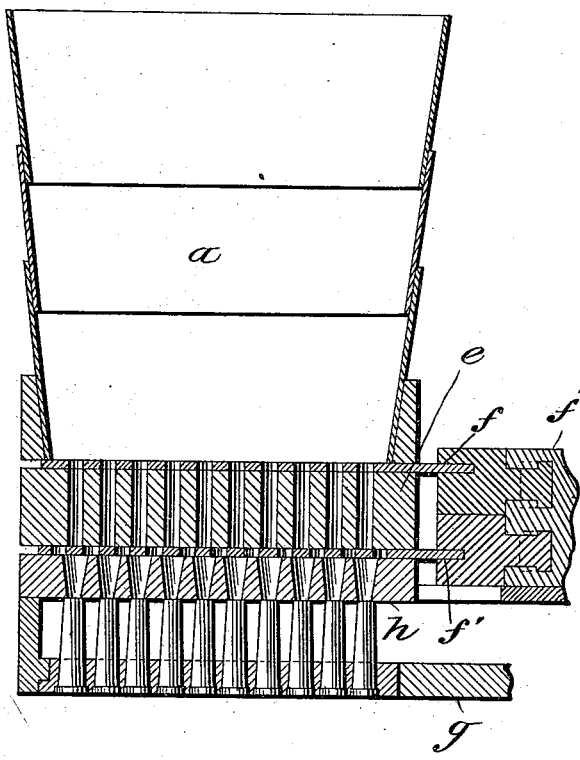
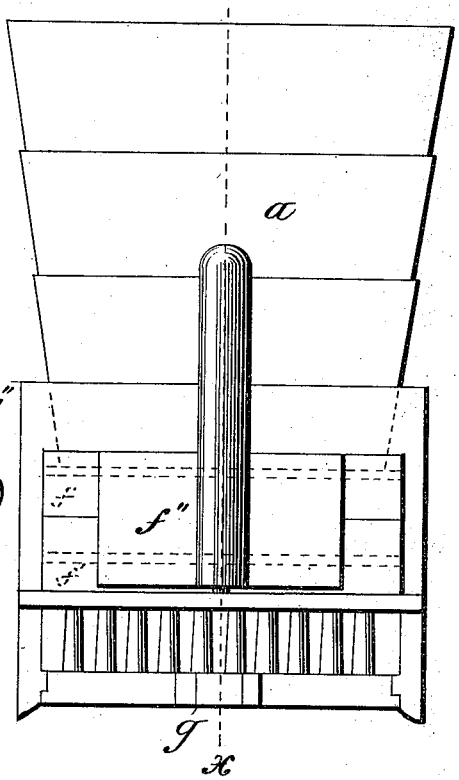
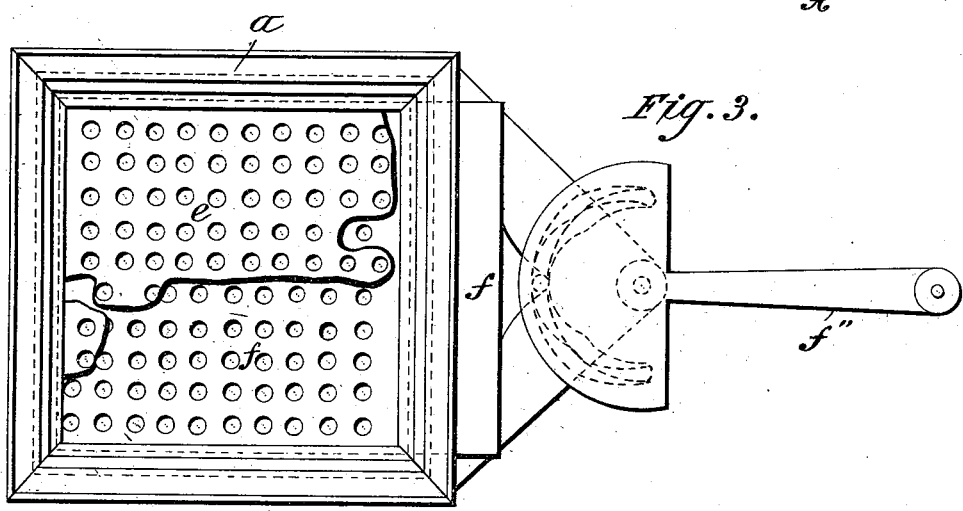
Witnesses:
Albert Watts
E. Livermore
Inventor:
G. G. Greenough
by J. J. Greenough

UNITED STATES PATENT OFFICE.

GEORGE G. GREENOUGH, OF FORT WARREN, MASSACHUSETTS.

LOADING APPARATUS FOR CARTRIDGE-SHELLS.

SPECIFICATION forming part of Letters Patent No. 376,148, dated January 10, 1888.

Application filed December 27, 1886. Serial No. 222,750. (No model.)

*To all whom it may concern:*

Be it known that I, GEORGE GORDON GREENOUGH, now residing at Fort Warren, Suffolk county, Massachusetts, have invented certain new and useful Improvements in the Charging Apparatus for Loading Shells, adapted to be used with my devices patented November 2, 1886, for sizing and reloading shells, of which the following is a specification.

The purpose of my invention is to measure and load charges of powder into a group or series of shells that are held in a resizing-block, $g$, used in my resizing and capping press, described in my patent aforesaid, where the shells are resized and capped before loading, all of which processes are performed without removing the shells from the resizing-block $g$.

The following is a description of my present device, referring to the accompanying drawings, in which—

Figure 1 is an elevation of the charger. Fig. 2 is a section view of the same on line $x$ $x$ of Fig. 1. Fig. 3 is a plan view of the charger-block and slide.

The resizer-block $g$, containing the shells that have been resized therein and capped, is placed in a receptacle in a frame containing a charging-magazine and measuring apparatus. This magazine $a$ contains powder in sufficient quantity to load the charges into a succession of series of shells with which the resizer is consecutively filled, so that as a number of shells filling the resizer-block are placed under the magazine they will be filled from it by a simple movement of slide-plates $f$ $f'$, hereinafter described.

The magazine $a$ may be composed of a series of horizontal sections, the lower one of which is fixed to the frame, and the others are drawn up, as in Fig. 1, to form the magazine when in use. For packing, they are closed down on the fixed section. Below the magazine $a$ there is a charger-block, $e$, perforated with holes (see Fig. 3) corresponding in number and position with those in the resizer-block $g$, so as to be in line with the holes therein when the resizer-block $g$ is placed in the recess in the frame made to receive it, indicated in the vertical section, Fig. 2. Each of the holes in the charger-block $e$ is formed to hold the exact charge of powder required to load the shell, (say seventy grains, more or less,) and the capacity of these chambers or holes can be changed by making the block to be varied in thickness. Between this charger-block $e$ and the magazine $a$ there is a sliding plate, $f$, at the bottom of the magazine, which is perforated with holes to correspond with those in the block $e$, and so arranged as to cut off the openings by a sliding movement, the communication between the magazine and the chambers in the block, or open the same to be charged from the magazine at the will of the operator. Below the charger-block $e$ there is a plate, $f'$, similar to plate $f$, to close and open the chambers below. These plates are so united as to consecutively close one and open the other by a single movement of a handle, $f''$, by means of which the charges are accurately measured, and then discharged into the shells below through tubes formed in a block, $h$, directly below plate $f'$, which fills the space in the frame between plate $f'$ and the recess, into which the resizer-block $e$ fits. The thickness of the block $h$ should be considerable, equal to about one foot or more, so as to give a sufficient fall to the powder to properly deposit it in the shell compactly, a matter of importance in loading. When the magazine is filled with powder and the plate $f$ closing the openings into the chambers of the charger, the apparatus is ready for operation. The resizer-block $g$, filled with capped shells ready for loading, is slid into the place in the frame of the charger formed to receive it, and by a movement of the operator the slide $f'$ is closed and the slide $f$ opened, by which movement all the chambers in the charger-block are filled from the magazine. By reversing the movement of the slide-plates the tops of the chambers are closed and their lower ends opened, by which the powder in the chambers is precipitated down through the tubes in block $h$ into the shells, which are then ready to receive the balls and have them affixed in the press to which the resizer-block is removed, as heretofore patented by me, which completes the operation of resizing, capping, and loading the shells without removing them from the resizer-block in which they are first inserted.

Having thus fully described my improvements for charging shells in a resizer-block with powder, I claim as my invention—

In an apparatus for loading cartridges, a frame carrying a feed-magazine, a charge-measuring block forming the base of the magazine, a device for holding the shells in position to receive the charge, a pair of cut-off slides, respectively above and below the charger-block, an operating-lever having reversely eccentric slots, and connecting-blocks between such lever and cut-off slides engaging such slots, whereby an alternate reciprocation is to given the slides, substantially as set forth.

In witness whereof I have hereto set my hand this 14th day of December, 1886.

GEORGE G. GREENOUGH.

In presence of—
 CHAS. HALL ADAMS,
 MARTIN MCDONOUGH.